Oct. 31, 1944.  H. BOBST  2,361,739
PNEUMATIC BRAKE OR STOP CONTROL FOR DECELERATING ROTATING ELEMENTS
Filed Sept. 17, 1941  2 Sheets-Sheet 1
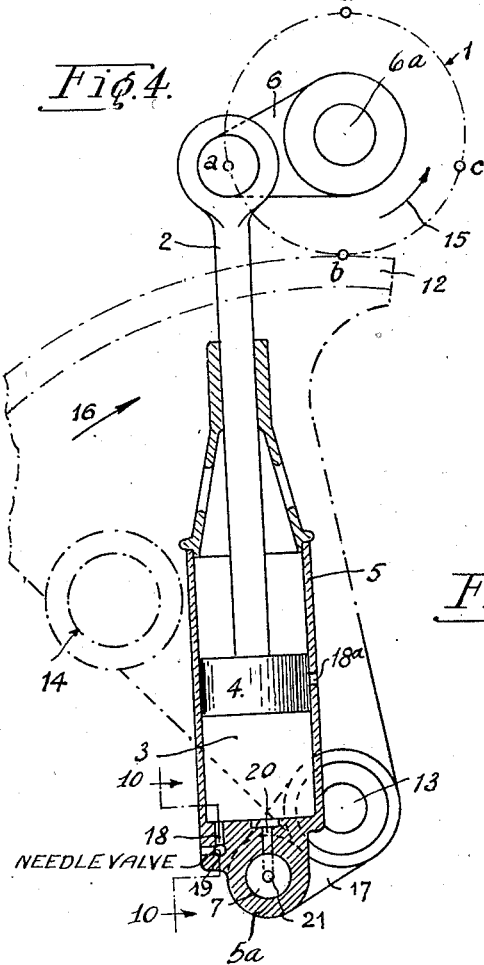
INVENTOR:
HENRI BOBST
BY Haseltine Lake & Co.
ATTORNEYS INVENTOR:
HENRI BOBST
BY Haseltine, Lake & Co.
ATTORNEYS.

Patented Oct. 31, 1944

2,361,739

UNITED STATES PATENT OFFICE 2,361,739

PNEUMATIC BRAKE OR STOP CONTROL FOR DECELERATING ROTATING ELEMENTS

Henri Bobst, Lausanne, Switzerland

Application September 17, 1941, Serial No. 411,148
In Switzerland November 18, 1940

6 Claims. (Cl. 188—94)

This invention relates to pneumatic brake for decelerating or stopping the rotation of elements.

The primary object of the invention is to provide a mechanism for decelerating or stopping a rotating element by the compression of a gaseous mass. More particularly, it is intended to provide a brake for a rotating element, for instance a shaft, by providing a crank arm rotating with the shaft, a cylinder oscillatable about an axis remote from the shaft, and a piston reciprocating in the cylinder and pivoted to the crank arm so that, upon rotation of the crank arm, compression of the air in the cylinder effects braking of the crank arm and, of course, the shaft. Since the most effective leverage in this arrangement can be obtained when the crank angle is approximately 90 degrees, it is herein proposed to arrange the element so that compression in the cylinder occurs while the piston rod is substantially tangential to the circle of rotation of the crank arm or, in other words, when the crank angle is substantially 90 degrees. However, under these circumstances a problem arises when rotation of the element resumes, which necessitates passing of the crank to and through dead center or the six o'clock position. This is because the air is highly compressed when the crank angle is 90 degrees, and further braking is undesired. The particular feature of the invention is to provide for the free swing of the crank so that unbraked rotation may be resumed by releasing the air compressed by the piston whereby to allow further movement of the piston.

Particular application of the invention is to a paper handling machine where the shaft to be controlled constitutes the sprocket shaft for driving chains carrying gripper bars which seize a piece of paper to be worked and carry it around through a series of positions. Obviously, the chains must be stopped frequently, possibly several thousand times an hour. While the stopping positions are highly critical, the inertia and momentum of the chains, the inherent slack, and the masses of the driving elements themselves give rise to serious problems in accurately positioning the pieces of paper for work. In this instance the object of the invention is to stop rotation of the intermittently driven shaft after each complete revolution of the shaft.

These and other objects will be apparent in the following specification and drawings in which Fig. 1 is a diagram illustrating the prior art and the problem;

Fig. 2 is a diagram illustrating one embodiment of the invention;

Fig. 3 is a diagram illustrating the second embodiment of the invention;

Fig. 4 is a vertical section through the third embodiment of the invention immediately after braking has been achieved, and when unbraked rotation of the drive shaft has been resumed;

Fig. 5 is a sectional view showing the Fig. 4 structure after counter-clockwise rotations past dead center from the Fig. 4 position;

Figure 9:
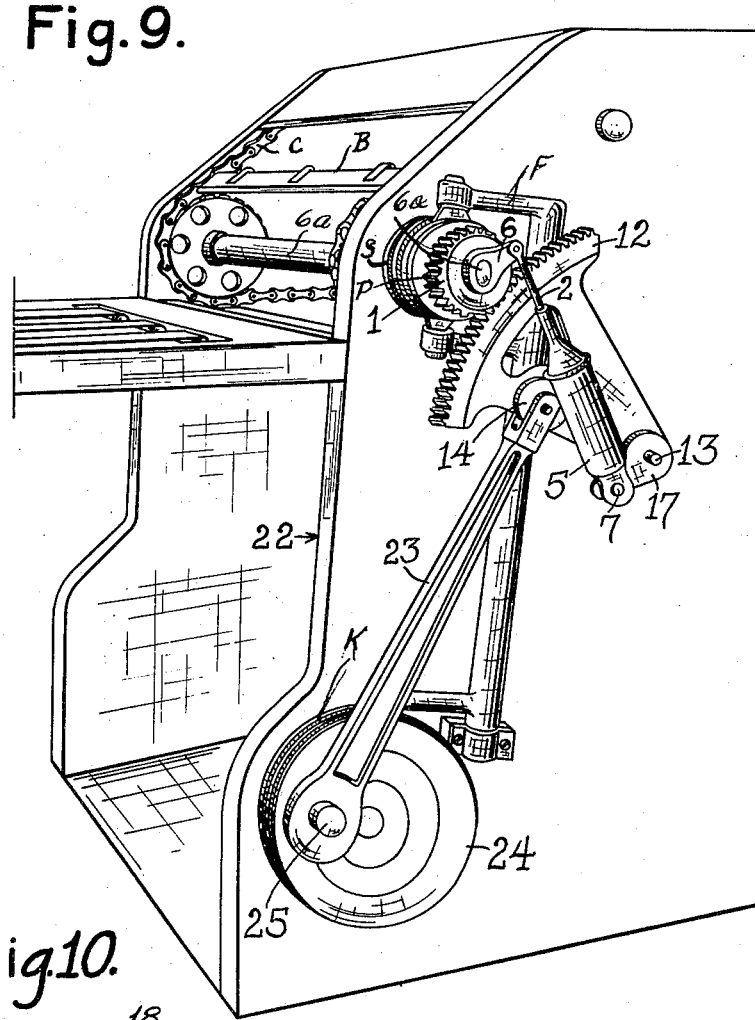
Figure 10:
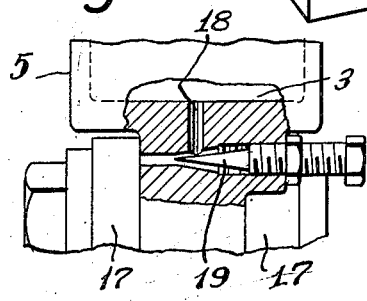

Figs. 6 to 8 inclusive are diagrams illustrating the relative positions of the relief channels through the various steps of the cycle;

Fig. 9 is a perspective view illustrating an application of the structure of Figs. 4 to 8 to a paper handling machine; and, Fig. 10 a detailed sectional view taken on the line 10—10 of Fig. 4.

Referring now to the drawings, in which corresponding elements are designated by similar reference numerals, the problem will be apparent in the Fig. 1 diagram wherein a rotative element is indicated by the broken line circle 1, the rotation being in the direction of the arrow. The upper end of piston rod 2 is pivotally connected to the rotating element 1 by a crank 6, and to the lower end of the piston rod is attached a piston 4 sliding in cylinder 5 pivoted to a fixed element at 7 for oscillation about a fixed axis so as to compress the air cushion 3. While it is desirable that braking effect of high compression occur as crank 6 approaches the Fig. 1 position, and while air cushion 3 is small, some arrangement must be made for releasing the compressed air 3 when further rotation past the Fig. 1 position is resumed, and to prevent engagement of piston 4 against the bottom of cylinder 5 as the crank nears its lower dead-center position.

One form of the invention is illustrated in Fig. 2, wherein the cylinder comprises a tube 5 open at both ends and rigidly affixed to bearing 7 for oscillation with the bearing with respect to the fixed element rotatably supporting bearing 7, there being an opposing piston 8 having a rod 9 connected to a gearing (not shown) for withdrawing piston 8 when piston 4 reaches the Fig. 2 position, and for returning piston 8 to the position shown as crank 6 approaches the Fig. 2 position.

A second embodiment of the concept is shown in Fig. 3, wherein the cylinder 5 has a fixed and closed lower end, but wherein the cylinder is slidably mounted in bearing 7. Bearing 7 is oscillatable with respect to its fixed support.

A rod 11 is connected to gearing (not shown) for withdrawing cylinder 5 downwardly when crank 5 reaches the Fig. 3 position, and for returning cylinder 5 to the position shown as crank 6 approaches the Fig. 3 position.

Figs. 4 to 8, inclusive, illustrate the preferred form of the invention, which may be utilized in a paper handling machine as shown in Fig. 9. For illustrating the utility, the function of the paper handling machine of the type disclosed in the copending application of Joseph Kury, Serial Number 411,149, filed September 17, 1941, and of common ownership herewith, will be briefly described.

In Fig. 9, the paper handling machine 22 includes the sprocket shaft 6a for intermittently driving the chains C carrying the gripper bars B. A pinion P is rotatably mounted on shaft 6a and has on its inner face a set of teeth. A sleeve S is splined to shaft 6a and carries on each end thereof a set of teeth, one of which sets engages those on the pinion when the sleeve is slid towards the pinion so that rotation of the pinion drives shaft 6a. Another set of teeth on the other side of sleeve S engages with a toothed member fixed on the frame of the machine so that when the sleeve is slid towards the frame, shaft 6a is locked to the frame. A fork F having fingers engaging in annular grooves in sleeve S is swung to slide the sleeve between its two axial positions by a cam slot K in drive wheel 24 connected to a suitable source of power.

A toothed sector 12 meshing with pinion P is oscillated about a fixed axle 13 by a rod 23 connected to the sector at 14 and to the drive wheel by the eccentric pin 25. The cam slot is so arranged that on the up stroke of rod 23, sleeve S is slid to engage pinion P so that shaft 6a is driven for one complete revolution and, on the down stroke of rod 23, sleeve S is slid from engagement with the pinion and is locked to the frame so that shaft 6a is locked against rotation. The pneumatic brake described herein is to apply a decelerating or stopping force to shaft 6a as the up stroke of rod 23 is completed and as sleeve S is shifted from driving engagement with pinion P into locking engagement with the frame.

Figs. 4 to 8 inclusive disclose the details of the preferred embodiment, where in the element 1 constitutes the rotative element rigidly affixed on shaft 6a, to which shaft the crank 6 is also affixed for rotation therewith. The element 1, which in Fig. 9 constitutes a thrust bearing for pinion P, can turn only in the direction of the arrow (Fig. 4), is intermittently rotated through the one-way drive including the pinion P and a mechanism as described in connection with Fig. 9 so that on each up-stroke of toothed sector 12, crank 6 undergoes one complete revolution and during the down-stroke of sector 12, pinion P is idle and crank 6, shaft 6a and element 1 are stopped. The point a and the shown position of piston 4 in Fig. 4 show the desired starting position of the parts respectively.

As in the previous embodiments, piston 4 is reciprocated by rod 2 in cylinder 5 as crank arm 6 rotates, but in this form the lower end of cylinder 5 has rigidly affixed to its lower end an annular bearing 5a pivotally supported on a pivot 7, and pivot 7 is rigid with a crank 17 which is rigid, or integral, with sector 12 so as to swing with the sector, as shown in contrasting Figs. 4 and 5.

The lower end of cylinder 5 is provided with an outlet passage 18 throttled by a needle valve 19 so that as piston 4 moves downwardly, only a limited amount of air escapes under the compression by the piston, as in a dash-pot. Cylinder 5 also is provided with an aperture 18a through the side wall for the escape of air as piston 4 starts downwardly from its uppermost position until the side of the piston covers the aperture. Aperture 18a is, of course, closed by piston 4 at the time braking starts.

The bottom of cylinder 5 is provided with a further passage 20 which, under certain periodical conditions, registers with an outlet passage 21 through pivot 7.

In operation, presupposing that the Figs. 4-8 arrangement is embodied in a machine such as shown in Fig. 9, it will be assumed that shaft 6a has just been unlocked, and sector 12 is starting its up-stroke to drive pinion P, shaft 6a, and arm 6 for one complete rotation. Passages 20 and 21 are in registry so that air can escape therethrough, thus allowing relatively unrestrained downward movement of piston 4 towards its lowermost position. Fig. 6 diagrammatically illustrates the relationship of the channels 20, 21 at the start of the cycle when the end of crank 6 moves to the b position of Fig. 4, while Fig. 7 shows the disaligned but still connecting relationship of the channels at the c point. By the time the d point is reached, the channels are unconnected as shown in Fig. 5, so that escape of air therethrough is prevented.

As rod 2 starts its down stroke from point d, air escapes substantially only through channel 18 and aperture 18a and as the point a is approached, aperture 18a is closed by piston 4 so that full braking occurs when sector 12 nears the end of its up-stroke. At the end of the up-stroke of sector 12, the a point is reached, pinion P is disengaged from driving relationship with shaft 6a, shaft 6a is held stationary, and aperture 20 is closed as shown in Fig. 5 which represents the end of the cycle.

When sector 12 reaches the end of its idle down stroke, passages 20 and 21 are again aligned so that the cycle may be resumed.

Having now fully described my invention, I claim:

1. A pneumatic braking device for the deceleration or controlled stopping of a rotative element comprising an oscillating toothed sector driving said rotative element for one complete revolution in one direction, a pneumatic brake cylinder and a piston movable therein, a connecting rod connecting said piston and rotative element, a crank integral with said sector, said brake cylinder being rotatably connected to said crank.

2. A pneumatic braking device for braking and stopping a rotative element after each complete rotation thereof, an oscillating toothed sector operatively engaging said element during its oscillation in one direction, a pneumatic brake cylinder and a piston movable therein, a connecting rod connecting said piston and rotative element to cause said piston to compress air in said cylinder to effect a quick braking of the rotative element, a crank integral with said sector, said brake cylinder being rotatably connected to said crank and said cylinder having at least one outlet to permit escape of some of the compressed air.

3. A pneumatic braking device for braking and stopping a rotative element after each complete rotation thereof, an oscillating toothed sector operatively engaging said element during its oscillation in one direction, a pneumatic brake cylinder and a piston movable therein, a connecting rod connecting said piston and rotative element to cause said piston to compress air in said cylinder to effect a quick braking of the rotative element, a crank integral with said sector, said brake cylinder being rotatably connected to said crank and an outlet in said cylinder in a position to be obturated by said piston as it approaches its upper dead point.

4. A pneumatic braking device for braking and stopping a rotative element after each complete rotation thereof, an oscillating toothed sector operatively engaging said element during its oscillation in one direction, a pneumatic brake cylinder and a piston movable therein, a connecting rod connecting said piston and rotative element to cause said piston to compress air in said cylinder to effect a quick braking of the rotative element, a crank integral with said sector, said brake cylinder being rotatably connected to said crank and said cylinder having at least one outlet to permit escape of some of the compressed air and a needle valve for regulating the area of said outlet.

5. A pneumatic braking device for the deceleration or controlled stopping of a rotative element comprising an oscillating toothed sector driving said rotative element for one complete revolution in one direction, a pneumatic brake cylinder and a piston movable therein, a connecting rod connecting said piston and rotative element, a crank integral with said sector, said brake cylinder being rotatably connected to said crank by means of a pivot member, said cylinder and pivot member each having complementary channels adapted in one position to register to place the compression space of said cylinder in communication with atmosphere.

6. A pneumatic braking device for the deceleration or controlled stopping of a rotative element comprising means for driving said element a complete revolution, a crank connected to said rotative element, a piston having a piston rod connected to said crank, means forming a compression space containing a compressible fluid said means including a part opposing said piston, said fluid being adapted to be compressed against the resistance of said opposing part by said piston to initiate braking of said element, and means coordinated with said driving means for moving said opposing part to lessen its resistance and thus gradually defer the complete operation of the braking mechanism.

HENRI BOBST.